C. S. JOHNSON.
WEED CUTTER AND CULTIVATOR.
APPLICATION FILED MAR. 31, 1919.
1,365,037.
Patented Jan. 11, 1921.
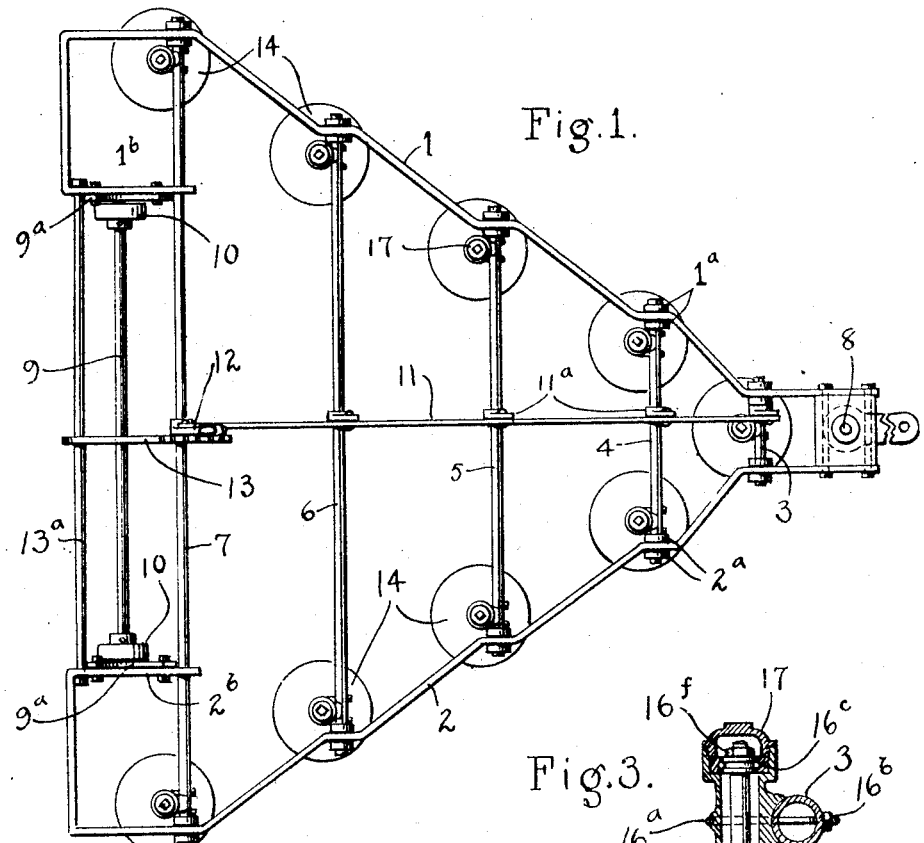
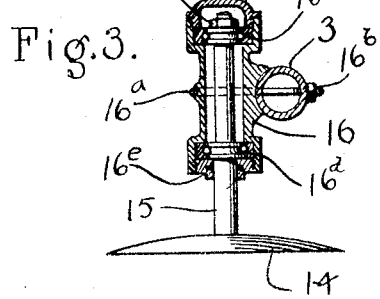
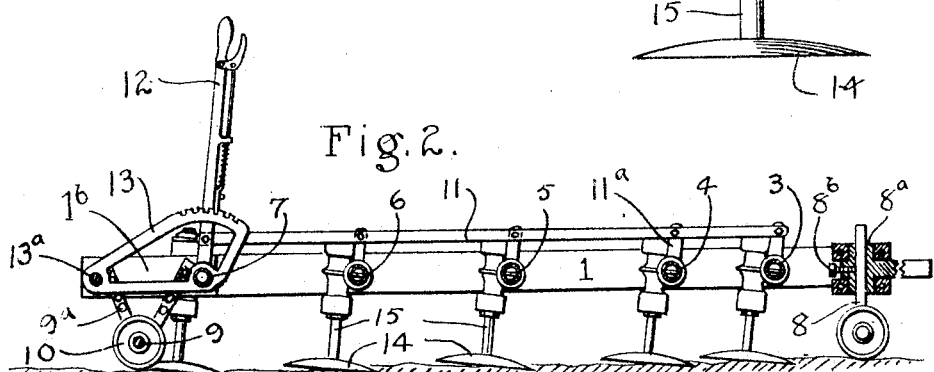
INVENTOR.
Charles S. Johnson.
BY A. B. Bowman
ATTORNEY

UNITED STATES PATENT OFFICE.

CHARLES S. JOHNSON, OF CHULA VISTA, CALIFORNIA.

WEED-CUTTER AND CULTIVATOR.

1,365,037.   Specification of Letters Patent.   Patented Jan. 11, 1921.

Application filed March 31, 1919. Serial No. 286,435.

*To all whom it may concern:*

Be it known that I, CHARLES S. JOHNSON, a citizen of the United States, residing at Chula Vista, in the county of San Diego and State of California, have invented a certain new and useful Weed-Cutter and Cultivator, of which the following is a specification.

My invention relates to a device for cutting weeds and the like and also for loosening the upper surface of the ground, thus providing a combined weeder and surface cultivator, and the objects of my invention are: first, to provide a device of this class consisting of a plurality of disks positioned horizontally and revolubly mounted on a frame so that they may revolve in either direction in accordance with their frictional contact; second, to provide a device of this class in which the disks are so positioned that their edges overlap each other so that the entire surface of the ground is covered with the plurality of disks; third, to provide a means for tilting these disks to various positions relatively to the ground; fourth, to provide means for supporting said disks so that they may be adjusted to certain positions relatively to the upper surface of the ground and fifth, to provide a device of this class which is simple and economical of construction, durable, easy to operate in which the weed-cutter members are self-sharpening and will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a top or plan view of my device; Fig. 2 is a sectional view through the middle thereof and Fig. 3 is a detailed sectional view on an enlarged scale of one of the disks and its bearing mechanism shown mounted on the support 3 and showing some of the parts in elevation to facilitate the illustration.

Similar characters of reference refer to similar parts and portions throughout the several views of the drawings.

The frame members 1 and 2, cross bars 3, 4, 5, 6 and 7, caster member 8, rear axle 9, wheels 10, bar 11, lever 12, rack 13, disk members 14, shaft members 15, bearing members 16, and grease cups 17 constitute the principal parts and portions of my weed-cutter and cultivator.

The frame members 1 and 2 are preferably metallic members shaped as shown and pivotally mounted therein are the opposite ends of the shafts 3, 4, 5, 6 and 7 by means of journals $1^a$ and $2^a$ and secured to these shafts 3, 4, 5, 6 and 7 are the bearings 16, the one on the shaft 3 being preferably mounted at the middle between the bars 1 and 2 while the others are mounted adjacent the journals $1^a$ and $2^a$, these bearings 16 being secured to the shaft by means of U bolts $16^a$ which extend around said bearings and pass through the shaft 3 and on their outwardly extended ends are provided nuts $16^b$. It will be here noted that the shafts 3, 4, 5, 6 and 7 are preferably hollow and made of pipe of suitable size and thickness to provide the proper strength, each of the bearings 16 being provided with extended recess portions in which are mounted ball-bearing race members $16^c$ and $16^d$. The race member $16^d$ is held in position by means of a lock nut $16^e$ screwed into the lower end of said bearing member and the race member $16^c$ is held in position by means of the grease cup member 17 which is screwed into the upper end of the bearing. The upper race member is secured to the shaft by means of a nut $16^f$ secured on the upper end of the shaft 15; secured on the lower end of this shaft 15 is the disk 14 which is preferably a concavo-convex disk with the concave surface down. Secured to the shafts 3, 4, 5 and 6 are arms $11^a$ which extend upwardly and to the upper ends of which is connected the bar 11 to the one end of which is pivotally connected the lever 12, the one end of this lever 12 being secured to the shaft 7 and this shaft is pivotally mounted in the rack 13 which is the lever rack and the rear end of said rack is supported by means of a rod $13^a$ which extends from the extended ends of the bars 1 and 2. Mounted on the members $1^b$ and $2^b$ of the bars 1 and 2 are the supports $9^a$ upon which is pivotally mounted the shaft 9 upon which are revolubly mounted the wheels 10 which support the rear end of the frame. These supports $9^a$ are provided with a plurality of holes adapted to adjust the wheel 10 relatively to the frame and the lever 12 is for the purpose of shifting the position of the shafts 3, 4, 5, 6 and 7 for tilting them to suitable positions as desired. The front end of the frame is supported by means of a double wheel caster 8 which is adjustably secured in the bearing 8ᵃ by means of a set-screw 8ᵇ and this bearing 8ᵃ is journaled in the front end of the frame which provides an adjustable support for the front end of the frame. It will be noted that the concavo-convex disks are only the preferable construction as it is obvious that a flat disk may be used.

Though I have shown and described a particular construction, combination and arrangement of parts and portions, I do not wish to be limited to this particular construction, combination and arrangement, but desire to include in the purview of my invention the construction, combination and arrangement substantially as set forth in the appended claims.

It is obvious that with this construction there is provided a weeder and surface cultivator which will not clog as the weeds will be turned by the revolution of the disk to a position back of the disks, that the disks are self-sharpening and will wear uniformly by reason of their revolving movement that they may be tilted as desired and that they may be supported so that they engage the upper surface of the ground as desired.

Having thus described my invention what I claim as new and desire to secure by Letters Patent, is:

1. In a device of the class described, a supporting frame and a plurality of concavo-convex disks each secured to a vertical axis with their concave surface down revolubly mounted in bearings adjustably connected to said frame.

2. In a device of the class described, a supporting frame, a plurality of concavo-convex disks each secured to a vertical axis with their concave surfaces down revolubly mounted in bearings adjustably connected to said frame and means for tilting said bearings and disks.

3. In a device of the class described, a supporting frame, a plurality of concavo-convex disks each secured to a vertical axis with their concave surfaces down revolubly mounted in bearings adjustably connected to said frame, means for tilting said bearings and disks and means for adjusting the position of said frame relatively to the ground.

4. In a device of the class described, a supporting frame and a plurality of concavo-convex disks each mounted on a vertical axis positioned horizontally and revolubly mounted in journals on said frame.

5. In a device of the class described, a supporting frame, a plurality of concavo-convex disks each mounted on a vertical axis positioned horizontally and revolubly mounted in journals on said frame and means for tilting said disks relatively to said frame.

6. In a device of the class described, a supporting frame and a plurality of disks each mounted on a vertical axis positioned horizontally and revolubly mounted in journals on said frame.

In testimony whereof, I have hereunto set my hand at San Diego California this 22 day of March 1919.

CHARLES S. JOHNSON.